US008868682B2

United States Patent
Yang et al.

(10) Patent No.: US 8,868,682 B2
(45) Date of Patent: Oct. 21, 2014

(54) TRACKER IN P2P SYSTEMS WITH DVD FUNCTIONALITIES

(75) Inventors: Xiaoyaun Yang, Madrid (ES); Minas Gjoka, Madrid (ES); Pablo Rodriguez, Madrid (ES); Parminder Chhabra, Madrid (ES)

(73) Assignee: Telefonica, S.A. (ES)

( * ) Notice: Subject to any disclaimer, the term of this patent is extended or adjusted under 35 U.S.C. 154(b) by 335 days.

(21) Appl. No.: 13/386,455

(22) PCT Filed: Jul. 23, 2009

(86) PCT No.: PCT/EP2009/059497
§ 371 (c)(1),
(2), (4) Date: Jul. 9, 2012

(87) PCT Pub. No.: WO2011/009489
PCT Pub. Date: Jan. 27, 2011

(65) Prior Publication Data
US 2012/0272282 A1    Oct. 25, 2012

(51) Int. Cl.
*G06F 15/16* (2006.01)
*H04N 7/173* (2011.01)
*H04L 29/08* (2006.01)

(52) U.S. Cl.
CPC .................................. *H04L 67/104* (2013.01)
USPC .............. 709/217; 725/97; 725/102; 709/231

(58) Field of Classification Search
CPC ............................ H04L 67/104; H04N 21/632
USPC ........ 709/206, 217–219, 231; 725/87, 88, 97, 725/102
See application file for complete search history.

(56) References Cited

U.S. PATENT DOCUMENTS

| | | | |
|---|---|---|---|
| 7,493,363 B2 * | 2/2009 | Huitema et al. | 709/204 |
| 7,925,781 B1 * | 4/2011 | Chan et al. | 709/238 |
| 8,060,648 B2 * | 11/2011 | Syed et al. | 709/236 |
| 8,352,692 B1 * | 1/2013 | Jordan | 711/162 |
| 2003/0212804 A1 * | 11/2003 | Hashemi | 709/228 |
| 2008/0256255 A1 * | 10/2008 | Mordovskoi et al. | 709/231 |
| 2009/0172179 A1 | 7/2009 | Miao | |
| 2009/0240833 A1 * | 9/2009 | Zhang | 709/236 |
| 2010/0125643 A1 * | 5/2010 | Gerber et al. | 709/217 |
| 2010/0293294 A1 * | 11/2010 | Hilt et al. | 709/241 |
| 2013/0305299 A1 * | 11/2013 | Bergstrom et al. | 725/93 |

OTHER PUBLICATIONS

International Search Report PCT/EP2009/059497; Dated Jan. 14, 2010.

* cited by examiner

*Primary Examiner* — Glenton B Burgess
*Assistant Examiner* — Benjamin Ailes
(74) *Attorney, Agent, or Firm* — Cantor Colburn LLP

(57) ABSTRACT

A method of optimizing the design of a Tracker in P2P applications to support DVD features, the method including determining for each peer and video operation the time T and jump point $P_j$, generating a hash key $HK_j$ for each peer, the hash key having a value $K_j=(P_j-T)/C$, where $C>=1$ is the granularity of the system, and grouping the peers with the same hash-key, where the system is designed to provide good viewer experience while supporting DVD features like pause, forward and backward jump operations.

5 Claims, 5 Drawing Sheets

TRACKER IN P2P SYSTEMS WITH DVD FUNCTIONALITIES

TECHNICAL FIELD

The present invention is related to Peer-to-Peer (P2P) systems, in particular, to the design of a tracker to support DVD features.

BRIEF DESCRIPTION OF RELATED ART

A tracker is a network component that provides peers with information to build high quality neighborhoods that makes sharing data possible without having to rely on the server except only as a last resort. A tracker also provides each peer with a mechanism to bootstrap data delivery to a requesting peer.

Most file sharing applications follow the download-then-consume model. Here, the tracker is designed to make a random selection of peers (as a neighborhood of a requesting peer). This random selection works well because peers are interested in the entire file. So, the tracker is not concerned with in-sequence delivery of file segments. Two of the most common algorithms used in such trackers are the random neighbor selection and the optimal neighbor selection.

The Random Neighbor Selection (RNS) is the simplest of all neighbor selection algorithms. In RNS, the tracker selects n peers at random from a list of active peers and returns them to the requesting peer. This is the standard algorithm used by most P2P tracker systems today. This is the most scalable of the tracker algorithms since it does not require any sophisticated data structure to maintain the candidate list of peers.

In the Optimal Neighbor Selection (ONS) the tracker is assumed to have global knowledge of every segment at every peer and performs exhaustive search over all peers to always return the peers with the most relevant segments. This is very good for peer neighborhood formation. However, it is prohibitively expensive for the tracker's processing load.

The demands placed on a P2P video on demand (VoD) tracker are entirely different. A user's demand for the next segment is guided by her current playback point. Hence, a careful choice of a neighbor's peer is needed to ensure a good system-wide performance. Further, the latency response of each request also becomes critical because it directly affects the user's experience of using jump operations, which would require a quick neighborhood selection to ensure quick recovery for playback.

Current state-of-art P2P systems ignore DVD functionality or jumps (fast forward, backward jump, pause etc.). The design is hard since DVD operations reduce P2P file sharing opportunities. In an ideal system, the server should be used only as a last resort to pull data. So, scheduling data in time and finding the right set of peers to share data are non-trivial issues that must be addressed as a first step towards designing peers that support DVD functionality and provide good user experience.

BRIEF SUMMARY

The goal of this invention is to describe an optimal design of a tracker to support DVD-features (ability to pause, jump forward and backwards in time) at the peers in a Video-on-demand (VoD) system while providing users, a good viewing experience.

The method and device of the invention design are based on the following two guiding principles:

(1) Users who are at (or near) the same playback point can benefit mutually by collaborating.
(2) Between jumps, users play video sequentially.

The tracker uses (1) to group users who are at the same playback point and (2) to estimate the current playback position of users in the system. Together, (1) and (2) allows a tracker to find and report suitable peers that can share content with requesting peers in a scalable way.

The design of the tracker is a two-step process. In the first step, we propose an efficient technique to group peers by playback point. In the second step, we design two smart algorithms, either one of which can be implemented at a tracker; Smart Neighborhood Selection (SNS) or History-based Neighborhood Selection (HNS). Both algorithms help a requesting peer form a neighborhood of peers with whom they can exchange data. If needed, both the Smart Neighborhood Selection and the History-based selection can be used to select the neighborhood, the former being used first to produce a subset of peers.

The following abbreviations are used:
P2P: Peer to peer system. Here, each node acts as both a client (request data) and a server (by making data available for other peers).
K: Number of fragments in a media file.
W: Window size
B: Size of buffer
$P_j$: Current playback point of peer j (as reported to the tracker).
$L_i$: List of peers playing fragment i (out of K total fragments).
$N_B$: Number of neighbors of peer B.
$H_i$: List of peers who have played fragment i in the past. As peers play a media, knowing the playback rate and the segment size of a peer, periodically, the segments played by a peer are updated in the History table maintained by the tracker.

The invention provides thus a method of grouping peers. The method comprises the steps of (a) determining for peer j, at the video time T, the jump point $P_j$, (b) generating a hash key $HK_j$. The hash key has a value $HK_j=(P_j-T)/C$, where $C>=1$ is the granularity of the system and finally (c) grouping peers with the same hash-key.

The hash-key value for a peer is updated when the next jump operation is performed. In a second step, a neighborhood of a requesting peer is selected from the group of peers with the same hash key as the requesting peer. If the number of peers in the neighborhood (peers having the same hash-key) is less than n, in a next step the remaining peers are selected from the neighbors with a hash key that is greater than but close to the hash key of the requesting peer, i.e. from neighbors which have already played the playback segment k of the requesting peer. If the number of peers in the neighborhood is still less than n, in a next step the remaining peers are selected randomly.

BRIEF DESCRIPTION OF THE DRAWINGS

To complete the description and in order to provide a better understanding of the invention, a set of drawings is provided. The said drawings form an integral part of the description and illustrate a preferred embodiment of the invention, which should not be interpreted as restricting the scope of the invention, but just as an example of how the invention can be embodied. The drawings comprise the following figures.

DETAILED DESCRIPTION

Figure 1:
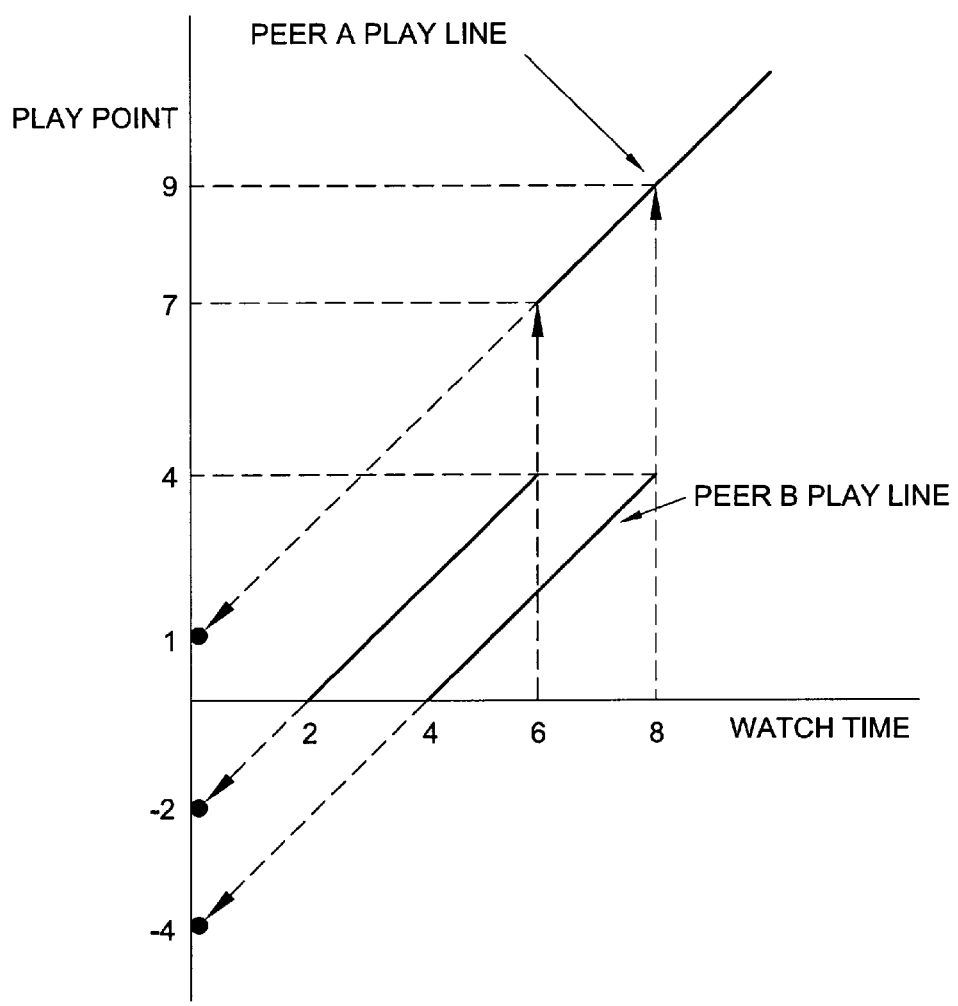
FIG. 1 describes an example that demonstrates grouping of peers by play point at the tracker.

The tracker is a key component in any P2P system. In a P2P VoD system, it has a particularly key role since peers will contact the tracker at:

(1) Start time, when request for content is made.
(2) Every DVD operation because the peer needs to find other peers with whom it can exchange data without having to go to the server for each segment.
(3) Every time a peer determines that its neighborhood does not contain high-quality peers to exchange data.

The present invention provides a method of grouping peers by play point for use in VoD systems that support DVD-functionality. Two ways of neighborhood selection at the tracker are then possible both based on this first grouping. To be effective, the tracker needs to group peers that can share data. Every time a peer needs a list of neighbors, it contacts the tracker with its current playback point. Based on the playback point, the neighborhood selection algorithm at the tracker invokes two mechanisms: (1) Finding the playback point of the requesting peer. (2) Neighborhood Selection that selects a list of peers that are at the same playback point as the playback point of the requesting peer and contains the necessary video information.

First, we show how to group peers by playing point. We will then propose two Neighborhood Selection algorithms, Smart Neighborhood Selection (SNS) and History-based Neighborhood Selection (HNS) to help a peer exchange data with its neighborhood.

Grouping Peers by Play Point:

To implement the smart neighborhood selection and the history based selection algorithms, the tracker needs to know the part of the video that each peer is playing when it receives a peer request for a list of neighbors. Since the play point increases with time, a naive tracker would have to re-calculate the play point of every peer at every request, thus incurring a very high overhead. To avoid having to do a per-peer computation, we created a hash table that keeps in each entry all peers that are playing the same part of the video. We use a hash key that is a function of the video time when the jump happened and the final jump point. We use a simple modulo operation as our hash function.

We illustrate this using an example. For a jump operation at video time T, peer j reports the jump point, $P_j$ to the tracker. The tracker generates a hash key $HK_j$ as follows: $HK_j=(P_j-T)/C$, where $C \geq 1$ is the granularity of the mechanism to predict the play point of peers. The granularity is chosen according to the tolerance of the users. It should be as small as possible, the lower limit being 1 second. However, a very low granularity can lead to misinterpretations. It has been calculated that the optimal C should be set to no lesser than 5 seconds. Then the peer is removed from the old hash entry and inserted into the new entry with key as $HK_j$. Note that the hash key $HK_j$ is static and the tracker does not need to update the peer in the hash table until the next jump operation. This is one of the advantages of the invention.

Figure 4A:
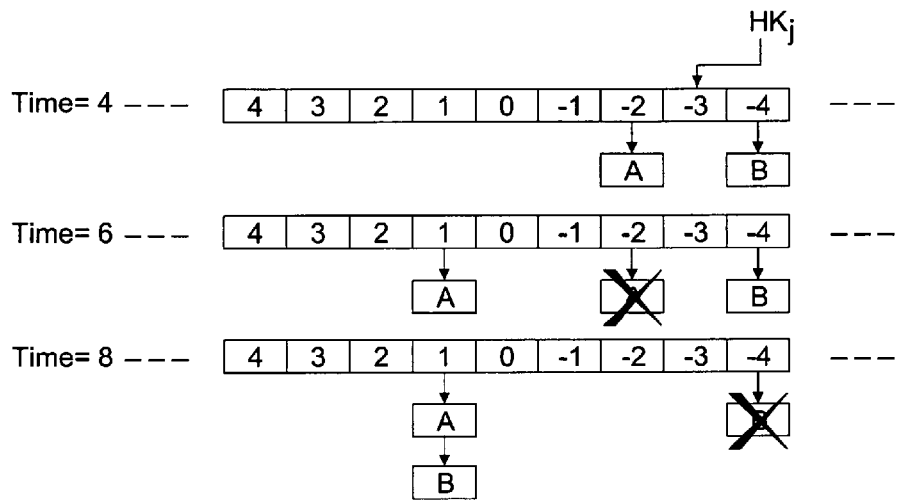
FIG. 4(a) shows how Hash Keys are used to group peers for the example in FIG. 1.

In FIG. 1, we demonstrate our approach using a numerical example. Peer A begins watching a video at time 2 and at time 6 jumps to play point 7. Assuming C=1, the hash key for peer A at the jump is 1. The hash key of peer A is the projection of its play point at jump time. We assume that Peer B has started playing at time 4. At time 8, Peer B jumps to play point 9. At time 9, peer B also has a hash key 1 and the tracker will return A as a peer in the same group as peer B. If the length of the media is very large, the size of the hash table can potentially reach the number of peers in the tracker. FIG. 4(a) gives a snapshot of hash keys before and after the jump.

To bound the size of hash table and to ensure that peers who leave the system are removed, every peer periodically contacts the tracker to inform it of its current play position. This keep-alive time, ($t_a$) is set to 15 minutes. With periodic reports, the number of keys is no more than $(L+t_a)/C$. Here, L is the length of video. For a 120 minute movie, $t_a$=15 minutes and C=1 minute, there are only 135 possible different active keys at that tracker at any time. By allocating 135 entries in the table, we can avoid collisions and achieve a complexity of O(1) to access/insert in a hash table.

Given that we now have a lightweight mechanism to group peers by playback point and make quick updates on jump operations, we discuss design of two neighborhood selection algorithms.

Smart Neighborhood Selection:

The SNS algorithm is shown below.
Algorithm 1 Smart Neighborhood Selection (SNS)
Require: Media file is divided into K fragments.
Require: For each media fragment i, tracker maintains a list of peers $L_i$ playing the fragment i.
Result: The tracker returns n neighbors to a requesting peer.
1: A peer A contacts the tracker with a playback point P it wants to jump to.
2: Neighborhood of A, $N_A=\phi$ (Initially, set to empty set)
3: Tracker estimates the fragment j of the playback point P, $1 \leq j \leq K$, P $\in$ fragment j and calculates its hash key $HK_j$.
4: Tracker randomly picks n peers from list $L_j$ and adds them to list $N_A$
5: count←j
6: sum←Size($L_j$)
7: while sum<n do
8: count←count+1
9: sum←sum+Size($L_{count}$)
10: add the set $L_{count}$ to $N_A$
11: end while
12: Add peer A to list $L_j$
13: return Neighborhood of A, $N_A$ The logic of our algorithm to select n neighbors follows the following steps, once a list of peers with the same hash key as the requesting peer has been generated according to the previous step:

1. If we cannot find n neighbors at the same playback point of the requesting peer, we attempt to get the remaining peers from a list of peers that are close to the play point of the requesting peer and have a higher hash key. The rationale behind this choice is that peers close in time to the requesting peer may already have played the segment and hence, can provide it to the requesting peer. So, for a peer that has jumped to a playback point in fragment j, if the tracker cannot find n peers at playback point j, the tracker will look for peers at playback point j+1, j+2, . . . K etc. in that order.

2. If the tracker gets to the last fragment K and still does not find n neighbors, it will randomly pick the remaining neighbors from playback points [1, j].

The algorithm thus comprises two steps: (1) calculating the playback point of a requesting peer is a constant-time operation as discussed previously and (2) finding n neighbors is also a constant time operation since the number of fragments K in a media file is small, much smaller than the number of peers in the system.

There are no hard guidelines for choice of value of n, the minimum number of other peers that a peer may be connected to. The value of n depends on the VoD application. Depending on network conditions and stability of peers, the P2P application determines a suitable choice of n. Normally, a value of n>10 is chosen.

Figure 2:
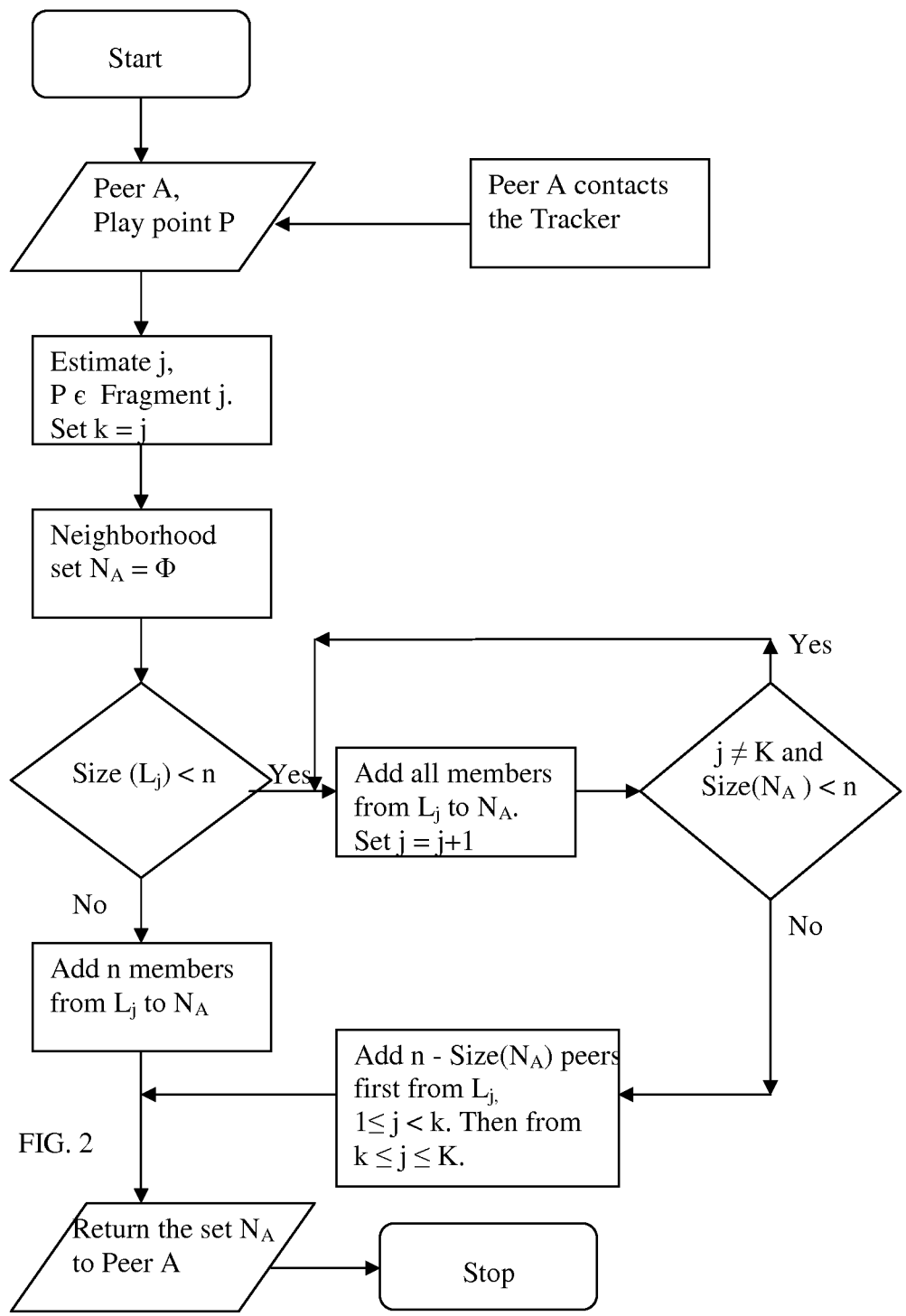
FIG. 2 is a flowchart of the SNS algorithm of the invention.

As seen in the above discussion, the SNS algorithm at the tracker is constant in time and tries to quickly find peers who can collaborate. A flowchart of the SNS algorithm is shown in FIG. 2.

Figure 4B:
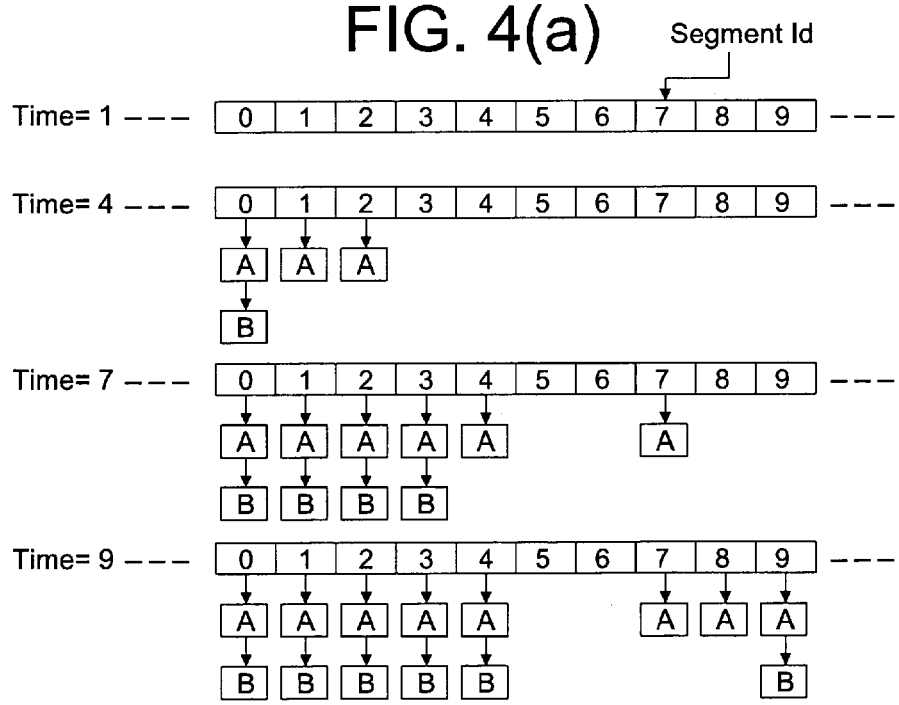
FIG. 4(b) shows the snapshot of the content of History table for the example of FIG. 1 as per the HNS algorithm.

Using FIG. 4(*a*), we demonstrate that for the example in FIG. 1, the Hash Key of peer A ($HK_A$) was initially −2. Likewise, the Hash Key of peer B ($HK_B$) was initially −4. At time=6, the peer A jumps resulting in a new $HK_A$=1. Likewise, when peer B jumps at time=8, the new $HK_B$=1. As per SNS, peer A will be returned to peer B as a neighbor to exchange data. If there are fewer than n peers with the same Hash Key, the algorithm will first attempt to find remaining peers with a higher Hash Key and if insufficient peers are found, try and find peers at random.

History-based Neighborhood Selection: The HNS algorithm is shown below.

Algorithm 2: History-based Neighbor Selection (HNS)
Require: Media file is divided into K fragments.
Require: For each media fragment i, tracker maintains a list of peers $L_i$ playing the fragment i.
Require: The tracker returns n neighbors to a requesting peer.
Require: For each jump operation, the tracker generates a history of segments, $H_j$ played by the peer. So, each playpoint $1 \leq j \leq K$ contains a list of peers that played that segment.
1: A peer B contacts the tracker with a playback point P it wants to jump to.
2: Neighborhood of B, $N_B = \phi$ (Neighborhood of B is an empty set)
3: Tracker estimates the fragment j of the playback point P, $1 \leq j \leq K$, P ∈ fragment j.
4: Tracker picks n peers randomly from list $L_j$ and adds them to list NB
5: if Size($L_j$)<n then
6: Pick the remaining n-Size($L_j$) peers randomly from the list $H_i$ and add them to NB
7: end if
8: Pick n-Size($L_j$) peers from lists $L_i$, j≤i≤K
9: Return neighbors for B, $N_B$ The history-based neighborhood selection algorithm differs from SNS in one key aspect. In addition to maintaining a list of peers $L_i$ for each playback point j ($1 \leq j \leq K$), the algorithm also maintains $H_j$, a history of all peers who have played segment j. Knowing the playback rate of media, the history of fragments played by a peer is periodically updated. Note that at least for popular content, the number of peers who have played segment j and are active in the swarm (and hence are in the table $H_j$) is likely to be higher than the number of peers who are playing segment j (and are part of the list $L_j$).

Figure 3:
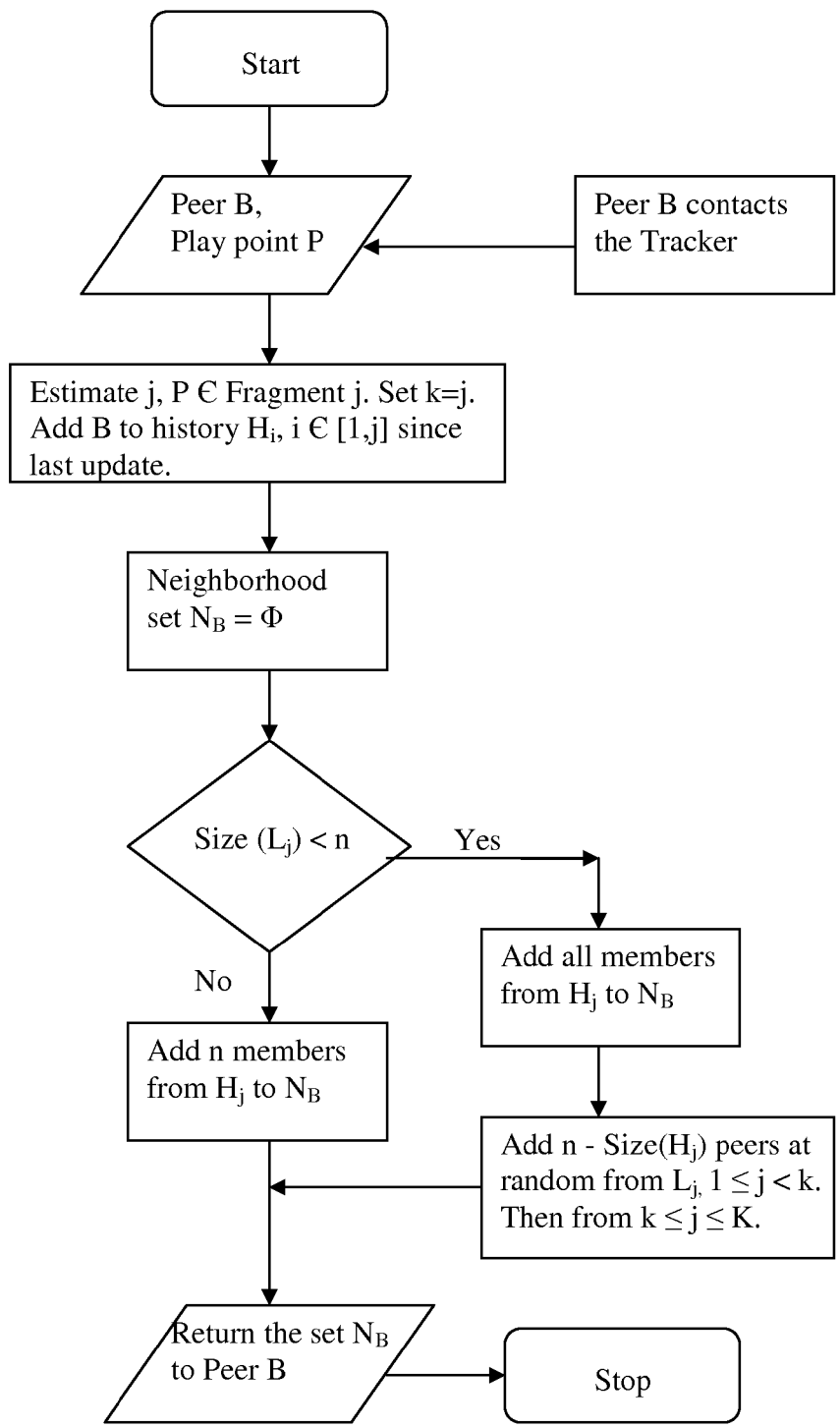
FIG. 3 is a flowchart of the HNS algorithm of the invention.

The logic of our algorithm to select n neighbors follows the following steps:
1. As in SNS, we first identify the playback point of the requesting peer and get a list of peers that are at the same playback point (and hence, having the same Hash Key). If not already updated, the history table is updated with all the fragments played since last update.
2. If we cannot find n neighbors at the same playback point as the requesting peer, we attempt to get the remaining peers from the history table. The rationale behind this choice is that we maintain a history $H_i$ of each fragment i seen by each peer.
3. If the tracker still does not find n neighbors, it will first pick the remaining neighbors from playback points [j, K].
4. If it still does not find n neighbors, it will pick the remaining peers from playback points [1, j). One reason this may work is that the peers use rarest-first algorithm in the upload scheduler, which allows peers to download fragments that have not been played locally yet. A flowchart of the HNS algorithm is shown in FIG. 3.

To generate the history table of the content of each peer, peers do not need to periodically report their content to the tracker. Instead, by estimating their current play point (by knowing the playback rate of the media they are playing) and the time since last contact (either start time, or last jump operation or last request for new neighbors), the tracker can infer the content of each peer and refresh the history table accordingly. The refreshing depends both on the number of peers and on the refresh time period. Therefore refreshing, which can be run as a background task, has O(n) complexity, while peer lookup is O(1).

The second part of the neighborhood selection (HNS) requires a separate history table that contains the segments that each peer has. Keeping history about a peer in the order of seconds is memory intensive and searching over it is resource intensive as well. In our implementation, we divide videos in time-fragments of size C. FIG. 4(*b*) shows snapshots of the history table at different time-points for the example in FIG. 1.

The memory requirement is $N_p * L * size(P_{id})/C$, where L is the length of the movie, $P_{id}$ is the unique peer-id of each peer and $N_p$ is the total number of peers. Each peer has a unique id of 32 bits. Thus, the tracker would require about 18 MB of memory to build the history for 20K peers, for a movie length of 120 minutes and with C=30 seconds. So, the memory requirements are very modest to maintain such a history table.

Impact of Peer Matching Algorithms:

To evaluate the performance of various peer assignment algorithms, we evaluate HNS and SNS against RNS and ONS. We will show that a random selection of such peers can result in neighborhoods where the peers do not have data to share, resulting in poor system performance.

Figure 5:
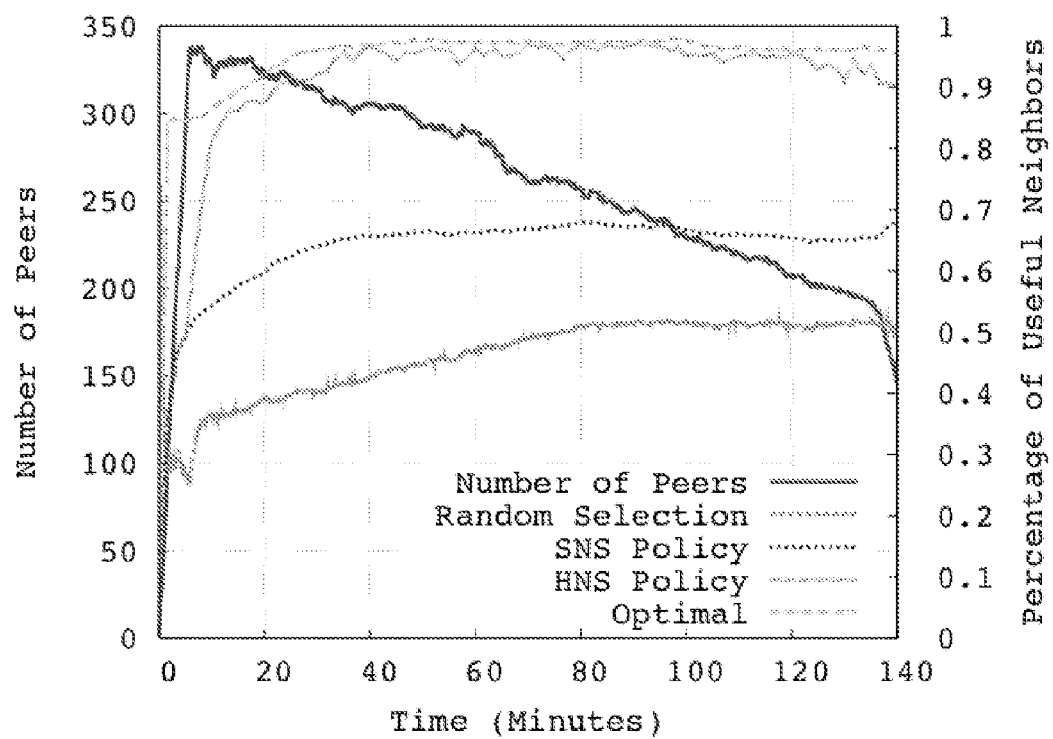
FIG. 5 shows a comparison of the performance of Peer Selection Algorithms at the Tracker.

FIG. 5 compares the performance of different algorithms, namely SNS and HNS, against an optimal neighborhood selection algorithm (ONS) and the simples among all, RNS. Since ONS has global knowledge of every segment at every peer and performs exhaustive search over all peers, it always returns peers with the most relevant segments. If there are N peers at the tracker and a media file of M fragments, each request to the tracker is O(N). From FIG. 5, we observe that under different workload with a larger number of jumps (from a live VoD trace), simple neighborhood selection strategies do poorly. Initially, both HNS and SNS algorithms have about the same percentage of useful neighbors. However, over time, as users jump, the fraction of useful neighbors returned by the tracker is quite small for both SNS and RNS, but is very high and close to the optimal peer selection strategy for HNS. Overall, SNS does much better than RNS since SNS selects peers that are close to the playback point of the requesting peer and hence, has a higher likelihood of forming useful neighborhoods. HNS performs nearly optimally and much better than SNS since HNS returns peers who have played the requested segment in the past. Peers returned by SNS on the other hand may not always have the requested segment since not all returned peers may be within a window of the requesting peer's playback point (because users jump).

We have shown that HNS performs nearly optimally and is constant time. The space requirement of the HNS is very minimal. While SNS outperforms RNS, it does not perform as well as HNS largely due to the fact that it does not take advantage of the fact that other active peers who do not share the playback point with the requesting peer may have viewed the same content in the recent history. Both HNS and SNS have been shown to be effective in a tracker design to support DVD operations in P2P VoD systems.

Additionally, scaling tests with the tracker showed that jump patterns with up to 16,000 simultaneous peers, the tracker can respond with less than 0.1 sec delay. The maximum memory usage observed was 32 Mbytes with CPU usage peaking at 74% for SNS algorithm. This is a negligible value when compared with the transmission time of the first segments of the video (2 sec for a 64 KB segment on a 1 Mbps link) and powerful machines available today.

Some applications of the tracker are as follows:
A sub-system within a P2P system to co-ordinate all peers (or a subset of peers if using multiple trackers).
To function as a neighborhood manager of peers in a P2P system to help peers find high quality neighborhoods to exchange data.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A method of grouping peers in a P2P system where DVD jump operations can be performed, the method comprising the steps of:
 a. determining, by a computing device, for each peer and video operation a time T and a jump point $P_j$
 b. generating a hash key $HK_j$ for each peer, the hash key having a value $HK_j=(P_j-T)/C$, where $C>=1$ is a granularity of the system
 c. grouping peers with the same hash-key
 d. selecting a neighborhood of a requesting peer from a group of peers with the same hash key as the requesting peer, wherein if the number of peers in the neighborhood of the requesting peer is less than n, where n is a design parameter, the remaining peers of the neighborhood of the requesting peer are selected:
  from a list of peers with a hash key greater than and close to the hash key of the requesting peer or
  from a list of peers that have already played a playback segment j of the requesting peer.

2. A method according to claim 1, wherein the hash-key value is updated when the next jump operation is performed.

3. A method according to claim 1 wherein if the number of peers in the neighborhood is still less than n, in a next step the remaining peers are selected randomly.

4. A method according to claim 1, wherein n has a value greater than 10.

5. A P2P system for video applications, the system comprising a tracker adapted to support jump DVD operations, wherein the tracker comprises:
 a memory storing computer executable code; and
 a processor configured to execute the stored code to:
  determine for each peer and video operation a time T and a jump point $P_j$
  generate a hash key $HK_j$ for each peer, the hash key having a value $HK_j=(P_j-T)/C$, where $C>=1$ is a granularity of the system
  group peers with the same hash-key
  select a neighborhood of a requesting peer from a group of peers with the same hash key as the requesting peer, wherein if the number of peers in the neighborhood of the requesting peer is less than n, where n is a design parameter, the remaining peers of the neighborhood of the requesting peer are selected from a list of peers with a hash key greater than and close to the hash key of the requesting peer or from a list of peers that have already played a playback segment j of the requesting peer.

* * * * *